Dec. 18, 1951  R. D. TRELEASE  2,578,863
INDIVIDUAL POULTRY FEEDING UNIT
Filed Feb. 11, 1949
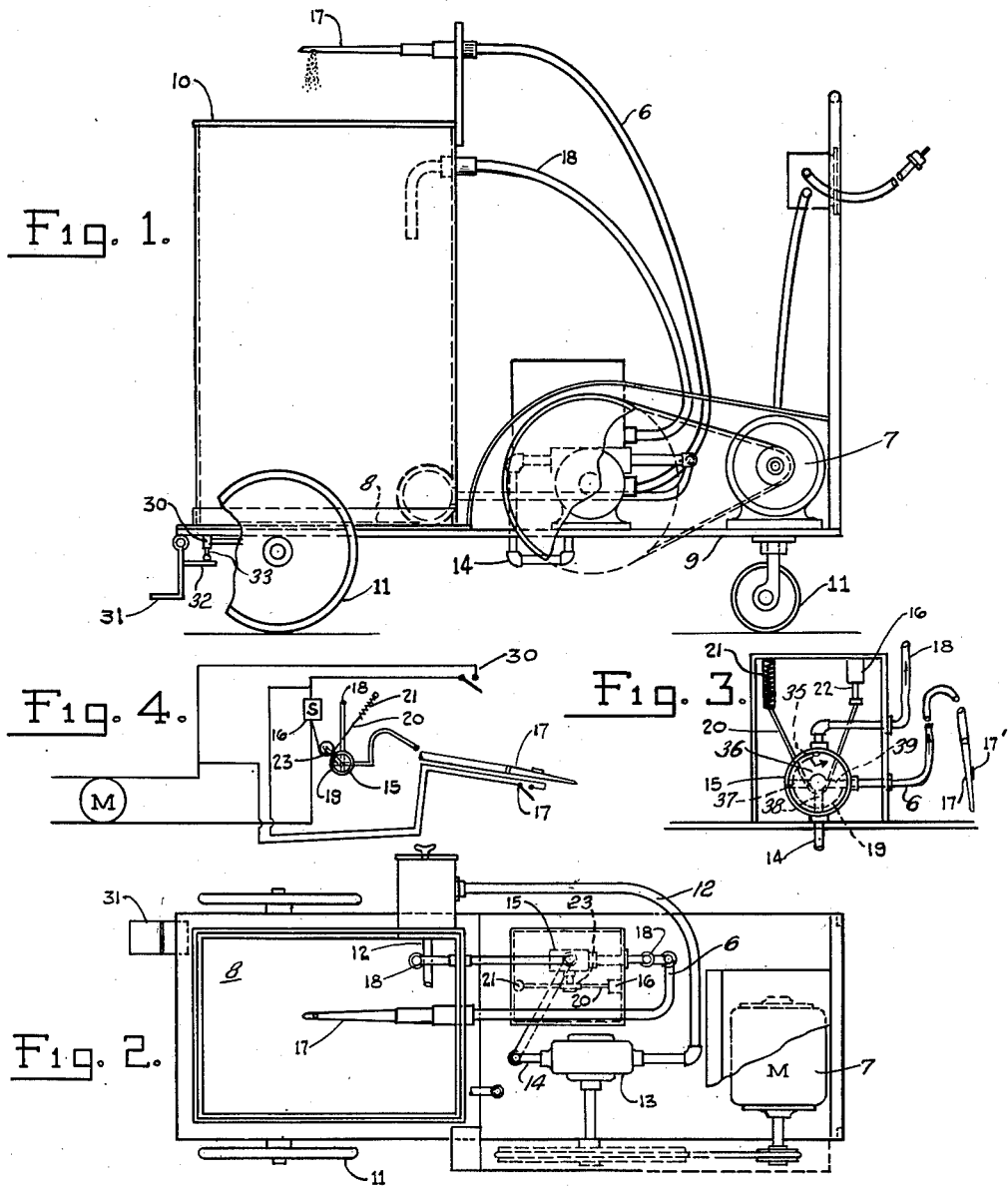
INVENTOR.
Richard D. Trelease
BY
R. G. Story
ATTORNEY Patented Dec. 18, 1951

2,578,863

UNITED STATES PATENT OFFICE 2,578,863

INDIVIDUAL POULTRY FEEDING UNIT

Richard D. Trelease, Chicago, Ill., assignor to Swift & Company, Chicago, Ill., a corporation of Illinois Application February 11, 1949, Serial No. 75,880

3 Claims. (Cl. 119—51)

This invention relates to a poultry feeding device and more particularly to an individual poultry feeding apparatus for handling a mash type of food.

It is an object of this invention to provide an improved individual type poultry feeder.

It is another object of this invention to provide an improved mash poultry feeding device.

It is another object of this invention to provide an improved mash feeder having provisions for keeping the mash uniform.

It is another object of this invention to provide a mash poultry feeder having a stirring arrangement for preventing the settling out of heavier mash particles.

It is another object of this invention to provide an improved nozzle arrangement to effect filling of the individual poultry product.

It is another object of this invention to provide an improved mash pumping means for individual poultry feeding.

It is another object of this invention to provide an improved mash distribution system.

The modern poultry-raising industry in the larger establishments has adopted the practice of individually feeding the poultry product. In following this practice, a semi-fluid or mash type of feed is gently delivered into the crop of the poultry product by means which issues the feed through the mouth of the bird directly into the crop until it is filled. It has been found that this practice eliminates waste and produces a maximum growth of the poultry product in the shortest time. The more aggressive birds get no more food than the others, and thus all of the product is fed equally so that all of the birds in a given batch progress at the best rate of growth for a given amount of feed.

Individual poultry feeding arrangements have been proposed in the past to deliver a fluid feed into the bird's crop, and the present invention is an improvement on known devices for this purpose. The present development provides a portable unit having means for rapidly servicing all birds in a given group and includes means for continuously agitating the mash type of feed to keep it homogeneous. This eliminates any settling out of the heavy particles so that all of the birds are fed the same mixture whereby more uniform results can be had.

The preferred form of this invention is shown in the drawings wherein:

Figure 1 represents an elevational view of the combination;

Figure 2 is a plan view of the combination;

Figure 3 is a diagrammatic representation of the valve mechanism; and

Figure 4 is a diagrammatic illustration of the electrical wiring.

Referring to Figure 1, a suitable tank 10 is provided for holding the liquid food mixture, which tank may be mounted in any conventional manner to be portable, as by being carried on wheels 11, rotatively connected to frame 9 fixed to the bottom of the tank.

At about the center of the bottom 8 of the tank 10, a circulating system for the mash is connected into the tank, and thus a pipe 12 opens into the floor of tank 10 from where it carries the mash feed to the inlet of the pump 13. The pump may be driven in any suitable manner, but preferably an electric motor drive generally 7 is connected to the pump. The pump delivers into supply header 14, which conveys the mash to a three-way valve generally 15, having a rotor 36 therein serving as a flow control member. The valve 15 may be and preferably is controlled by a solenoid means 16, which turns the valve rotor 36 as hereinafter described. The supply header 14 is connected through valve 15 to either a feeding nozzle 17 through a flexible tube 6 or a return by-pass 18.

When the rotor of valve 15 is turned to deliver the fluid or mash feed to nozzle 17, the feed passes through a flexible tube and out nozzle 17 into the crop of the bird to be fed. The flexible tube connected to nozzle 17 may be of any convenient length but is preferably kept as short as possible and serves to deliver the feed whenever desired to issue it into the bird's crop. The solenoid means 16 used to control the operation of the three-way valve 15 is connected into a circuit containing an electrical switch 17' built into the nozzle and near the end thereof so that by manipulating the switch with his thumb, the operator can control the valve 15 and the nozzle with one hand. With this arrangement the operator's other hand is left free to handle the poultry product when the nozzle is to be inserted to accomplish the desired feeding.

The preferred form of the solenoid switch operating means and nozzle arrangement has been described above. Referring now to Fig. 1, an alternate construction is shown. In this form of the mechanism the nozzle 17 may be fixedly mounted over tank 10 and turned so as to squirt the feed mixture downwardly into the tank, should the valve 15 be turned to feeding position when no bird is over the nozzle. With this set-up, the birds are brought to the machine and placed over the nozzle, and the solenoid is actuated. The switch for accomplishing this may position on the nozzle, but preferably an alternate switch 30 may be used, which is mounted on the front end of the machine. This switch is actuated by a vertically moving plunger 33 that is normally spring biased to an open position. When it is desired to feed a bird, the operator may step on the pivotally mounted treadle 31 whereby the extending lever 32 is lifted to close switch 30 to operate valve 15 by energizing solenoid 16. After the feeding has been completed, the treadle is released and the switch returns to its normally open position. It is to be noted that the treadle 31 is removably fixed to its pivotal support so that it may be taken off when not in use. This eliminates any possibility of accidentally energizing the solenoid, as for example, while pushing the mechanism from one feeding station to the other.

As shown in Fig. 4, switch 30 and switch 17' may both be connected in parallel with the solenoid circuit so that either switch may be used without requiring a separate hookup operation.

After the feeding operation has been completed, valve 15 is turned to cut off the flow to the feeding nozzle 17 and the pump delivers the feed through the supply header 14 into the by-pass cross passage 18. The feed is directed back into the tank through the by-pass and during the period between each feeding operation the mash feed in the tank is continuously recirculated so that a homogeneous mixture is maintained in the tank. The volume of the tank is proportioned to the flow of the pump whereby a sufficient agitation is produced to maintain the homogeneity of the mixture while at the same time producing a gentle but rapid filling of each individual poultry product during the feeding operation.

The usual mixture of mash feed is carried in a sufficient quantity of fluid to make it flow easily, and ordinarily the mixture is substantially incompressible. Therefore, during normal operations, since the pump is running continuously, it has been found desirable to arrange valve 15 so that it is never completely cut off and so that a continuous flow of fluid through the circulating system may take place. For this purpose the rotor 36 of the valve 15 may be provided with an undercut cross passage 19 through which the feed may flow to the by-pass cross passage 18 before passage 17 is cut off and as the valve is moved to the by-pass position. Rotor 36 has converging passages 37, 38, and 39 as shown in Figure 3. Passages 38 and 39 provide a full flow to nozzle 17 when solenoid 16 is energized. When solenoid 16 is de-energized, the rotor 36 is turned so that passages 37 and 39 provide a full flow to by-pass 18. With the solenoid energized as shown in Figure 3, the upper end 35 of the undercut passage 19 is just in communication with the opening to by-pass 18. As soon as rotor 36 is turned slightly clockwise in Figure 3 so as to partially lessen the fluid connection to nozzle 17, the undercut passage 19 comes into more complete communication with the opening to by-pass 18 to increase the flow therethrough. Thus, even when the valve 15 is being turned to shut off the flow of fluid into the feeding nozzle, there is never any time when the system, including the inlet pipe 12 and supply header 14 and by-pass 18, is completely closed off. This permits the pump 13 to work continuously without driving against an incompressible fluid, so that no undue load is ever built up in the drive system.

The solenoid drive for turning valve 15 may take any form, but preferably a flexible strap 20 is connected at one end to spring 21 and at the other end to the armature 22 of the solenoid 16. The center portion of the strap passes over a pulley 23 that is fixedly connected to the rotor 36 of the rotary valve 15 so that as the wheel 23 is turned, the flow control member of valve 15 moves to connect the supply header to the feeding nozzle or the by-pass. Spring 21 may be connected to return the valve to starting position when the solenoid is de-energized so that the feed is delivered into the by-pass.

When the switch at the end of the feeding nozzle 17 is operated and a circuit is established such that the solenoid is energized, the strap is pulled around the wheel against the tension of the spring and turns the wheel 23 in a counter clockwise direction, Fig. 3. This turns valve 15 to its open position such that feed is delivered to the feeding nozzle 17, the position shown in Figure 3. As above explained, when the switch is released, the solenoid is de-energized, and spring 21 returns valve 15 to the by-pass position.

The pump 13 may take the form of any positive acting pump, such as a gear pump, or the like. Preferably a rotary pump is used to deliver the feed through the system with the least working of the materials.

It is also to be noted that the switch for operating solenoid 16 may be positioned in any convenient spot, but preferably it is mounted at the nozzle. Thus, when the nozzle has been inserted into the crop of the poultry product while the bird is being held with one hand, the nozzle and switch can be manipulated by the other.

From the description given above it is apparent that efficient and rapid feeding of poultry product may be accomplished with this device. A mixture of fluid and solid feeds is produced in tank 10, and the mixture is maintained by the continuous circulation of the feed through the circulating system, including the inlet 12, pump 13, supply header 14, valve 15, and by-pass 18. As long as the pump operates, the mash is continuously moved through the system to maintain an even distribution of the solids in the liquid phase.

When it is desired to feed a poultry product, the device is wheeled to the product to be fed and the nozzle at the end of the flexible hose is simply inserted into the mouth and crop of the bird, or the bird is positioned over the fixed nozzle that is shown in Fig. 1. The solenoid is then energized to turn valve 15 to the feeding position and the mash is forced through the feeding nozzle 17 into the crop of the bird. The pressure produced in the liquid feed issued from the nozzle and the design of the feeding system are such that the mash is gently issued from the nozzle into the crop of the bird until the bird is filled. The nozzle is then gently withdrawn after the solenoid has been de-energized. As soon as the solenoid is de-energized, the feeding system is cut off and the entire output of the pump is delivered through the by-pass to continue the mixing of the feed mash.

The above description sets forth the preferred form of the present invention and its mode of operation. It is obvious that many modifications may occur to those skilled in the art, which will fall within the scope of the following claims.

I claim:

1. A poultry feeding device mounted on a frame including a reservoir for holding a mash form of poultry feed, a power driven continuously running pump, the intake of said pump connected to and communicating with a lower portion of said reservoir to withdraw feed therefrom, a discharge line from said pump, a poultry feeding nozzle, a recirculating line opening into said reservoir, a valve having an intake opening, two discharge openings, and a flow control member within said valve to direct the flow from said intake opening to either of said discharge openings, the intake opening of said valve connected to and communicating with the discharge line of said pump, one of said discharge openings connected to and communicating with said nozzle and the other discharge opening connected to and communicating with said recirculating line whereby the flow control member may be used to direct the flow to the nozzle or to said recirculating line, and a cross passage means between said discharge line and said recirculating line to permit the feed to flow from the pump to the recirculating line even when said control member of said valve is positioned to direct the flow from the pump to the nozzle.

2. A poultry feeding device mounted on a frame including a reservoir for holding a mash form of poultry feed, a power driven continuously running pump, the intake of said pump connected to and communicating with a lower portion of said reservoir to withdraw feed therefrom, a discharge line from said pump, a poultry feeding nozzle, a recirculating line opening into said reservoir, a valve having an intake opening, two discharge openings, and a flow control member within said valve to direct the flow from said intake opening to either of said discharge openings, the intake opening of said valve connected to and communicating with the discharge line of said pump, one of said discharge openings connected to and communicating with said nozzle and the other discharge opening connected to and communicating with said recirculating line whereby the flow control member may be used to direct the flow to the nozzle or to said recirculating line, electrically actuated valve operating means operatively connected to said flow control member, and a cross passage means between said discharge line and said recirculating line to permit the feed to flow from the pump to the recirculating line even when said control member of said valve is positioned to direct the flow from the pump to the nozzle.

3. A poultry feeding device mounted on a frame including a reservoir for holding a mash form of poultry feed, a power driven continuously running pump, the intake of said pump connected to and communicating with a lower portion of said reservoir to withdraw feed therefrom, a discharge line from said pump, a poultry feeding nozzle, a recirculating line opening into said reservoir, a valve, and electrically actuated valve control means, said valve including a body with a circular interior opening, with an intake opening, and with two discharge openings, said intake opening communicating with said interior opening and with the discharge line of said pump, one of said discharge openings communicating with said interior opening and with said nozzle, the other discharge opening communicating with said interior opening and with said recirculating line, and a rotor within said interior opening, said rotor being connected to said electrically actuated valve control means, said rotor having intersecting inner passages so arranged that the passages will connect said intake opening with said one discharge opening at a first setting of said rotor and with said other discharge opening at a second setting of said rotor, said rotor having an undercut passage about a portion of the periphery thereof, said portion intersecting said intake opening and a small portion of said other discharge opening when said rotor is at said first setting and intersecting both of said last-mentioned openings as said rotor is moved from said first setting to said second setting.

RICHARD D. TRELEASE.

REFERENCES CITED

The following references are of record in the file of this patent:

UNITED STATES PATENTS

| Number | Name | Date |
| --- | --- | --- |
| Re. 21,755 | Kelley | Mar. 25, 1941 |
| 406,248 | Williams | July 2, 1889 |
| 1,364,003 | Smith | Dec. 28, 1920 |
| 1,511,450 | Findlay | Oct. 14, 1924 |
| 1,700,471 | Davis | Jan. 29, 1929 |

FOREIGN PATENTS

| Number | Country | Date |
| --- | --- | --- |
| 4,645 | Great Britain | Mar. 25, 1890 |